(No Model.) 2 Sheets—Sheet 1.

G. HOSKINS.
GATE.

No. 460,969. Patented Oct. 13, 1891.

Witnesses
Jas. K. McCathran
H. J. Riley

Inventor
George Hoskins
By his Attorneys,
C. A. Snow & Co.

(No Model.) 2 Sheets—Sheet 2.

G. HOSKINS.
GATE.

No. 460,969. Patented Oct. 13, 1891.

Witnesses
Jas. L. McCathran
H. J. Riley

Inventor
George Hoskins
By his Attorneys,
C. A. Snow & Co.

UNITED STATES PATENT OFFICE.

GEORGE HOSKINS, OF DURHAM, MISSOURI.

GATE.

SPECIFICATION forming part of Letters Patent No. 460,969, dated October 13, 1891.

Application filed May 13, 1891. Serial No. 392,585. (No model.)

*To all whom it may concern:*

Be it known that I, GEORGE HOSKINS, a citizen of the United States, residing at Durham, in the county of Lewis and State of Missouri, have invented a new and useful Gate, of which the following is a specification.

The invention relates to improvements in swinging gates.

The object of the present invention is to provide a swinging gate adapted to be opened in either direction without dismounting from a vehicle or animal, and capable of being adjusted vertically to enable small animals to be separated from larger ones.

The invention consists of the construction and novel combination and arrangement of parts hereinafter fully described, illustrated in the accompanying drawings, and pointed out in the claims hereto appended.

Figure 1:
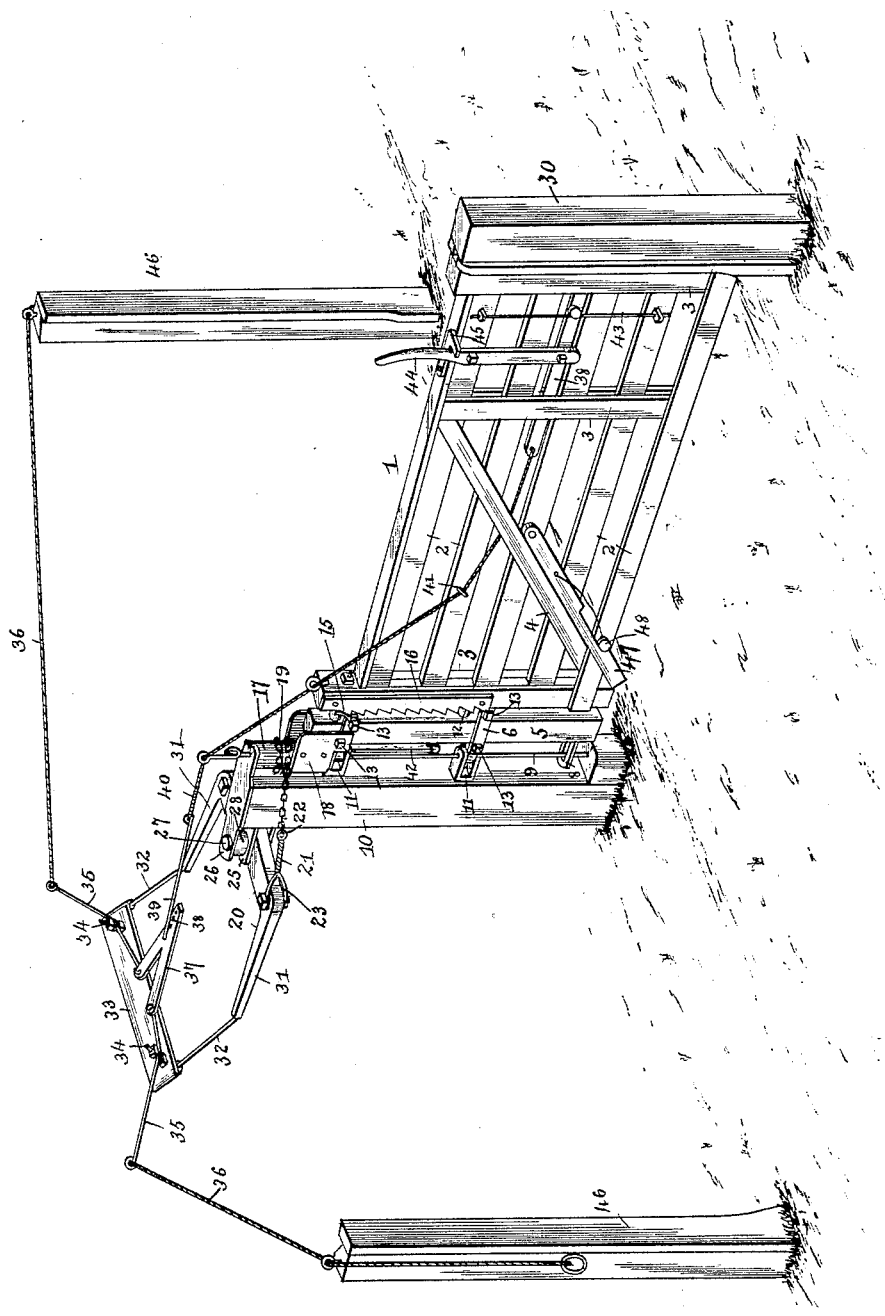
Figure 2:
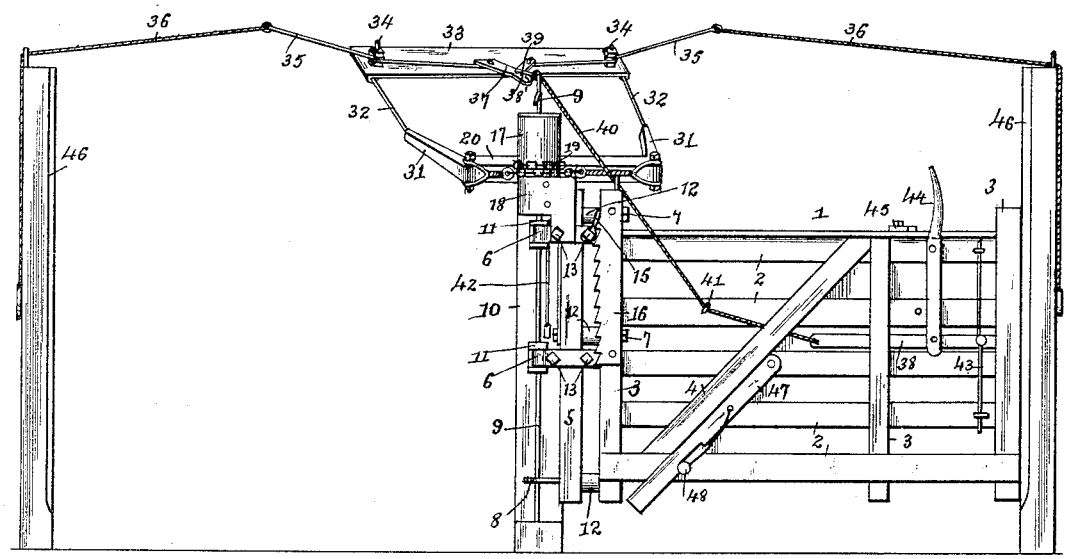
Figure 3:
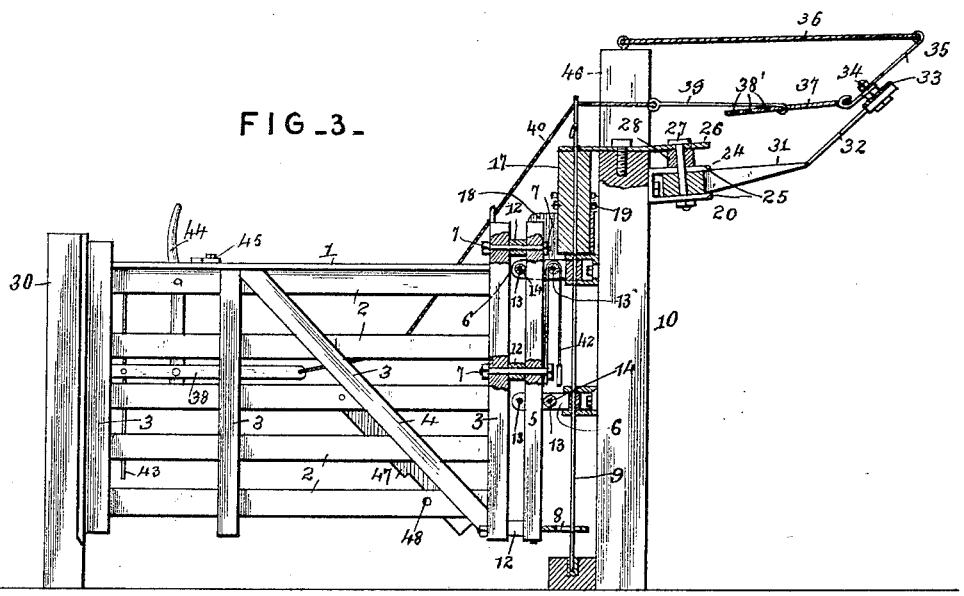

In the drawings, Figure 1 is a perspective view of a gate constructed in accordance with this invention. Fig. 2 is a side elevation, the same being open. Fig. 3 is a vertical longitudinal sectional view, the gate being closed.

Referring to the accompanying drawings, 1 designates a swinging gate consisting of horizontal rails 2, vertical bars 3, and inclined braces 4, and provided at its inner end with a vertical bar 5, which is arranged in hinge-straps 6 and is vertically adjustable therein. The vertical bar 5 is secured to the gate by bolts 7 and 8, the latter of which is arranged at the bottom of the gate and is provided with an eye adapted to receive a pintle-rod 9. The pintle-rod hinges the gate to a post 10 and passes through perforated ears of castings 11, and through eyes of the hinge-straps 6. The said bar 5 is arranged a short distance from the gate, and spacing-sleeves 12 are arranged on the bolts 7 and 8 and interposed between the bar and the gate. The sides of the hinge-straps 6 are connected by transverse bolts 13 arranged at the inner and outer edges of the bar 5, and provided with anti-friction rollers 14, which enable the bar 5 to slide freely in the vertical adjustment of the gate.

The gate is maintained in its vertical adjustment by a pawl 15, arranged on the upper hinge-strap and mounted on one of the bolts thereof and adapted to engage a rack-bar 16, secured to the gate and provided at its outer edge with a series of teeth.

The upper end of the bar 5 is provided with a drum 17, which is secured to the bar by a clip 18, and around which is wound a chain or strap 19, and the latter has its ends connected with a pivoted U-shaped frame 20. The ends of the chain or strap 19 are connected with opposite sides of the pivoted frame by wires 21, which are twisted and provided with eyes 22 and diverging ends 23. The eyes 22 of the wire connections 21 are attached to the ends of the chain or strap 19, and the diverging ends are bent to form eyes to receive bolts which secure them to the pivoted frame 20.

The frame 20 is constructed of metal and is horizontally disposed and is pivoted in a bracket 24, which is provided with perforated ears 25, and is arranged at the upper end of the hinge-post 10, and is braced by a plate 26, which is secured to the top of the post and projects from opposite sides of the same. The plate 26 has secured to it the upper end of a bolt 27, which pivots the frame 20 in the bracket, and a block 28 is interposed between the bracket and the plate. The other end of the plate is provided with a perforation in which is arranged the upper end of the pintle-rod. As the frame 20 turns on its pivot the drum 17 is rotated and the gate is swung either to or from a latch-post 30. The arms 31 extend from the hinge-post and have secured to them upwardly-inclined rods 32, which are connected by a cross-bar 33, and bolts 34, which secure the cross-bar to the rods 32, serve as fulcrums for levers 35. The outer ends of the levers are attached to operating ropes or chains 36, and the inner ends of the levers are secured to the arms of a Y-shaped plate 37, which is connected with a spring-actuated latch-bolt 38. When the operating ropes or chains are pulled upon, the levers 35 withdraw the spring-actuated latch-bolt and a continued pulling upon the latch rope or chain will turn or swing the pivoted frame 20 and rotate the drum and swing the gate.

The Y-shaped plate 37 is provided in its stem or shank with a series of perforations 38', arranged to be engaged by a hook 39, which is attached to one end of a cord 40, that runs through guide-eyes 41 on the gate and has its other end secured to the inner end of the latch-bolt. The perforations of the Y-shaped plate enable the latch-cord to be adjusted to the height of the gate, which is raised by a strap 42, having one end secured to the bolt 8 of the bar 5 and passing over the outer anti-friction roller of the upper hinge-strap 6.

The latch-bolt 38 is normally held extended by a spring 43 and is pivoted to the lower end of a hand-lever 44, which is fulcrumed on the gate and projects above the same and enables the gate to be opened without using the operating ropes or chains. The latch-bolt 38 is locked against withdrawal by an L-shaped plate 45, pivoted to the top of the gate and arranged to engage the hand-lever.

The means for operating the levers 35 may be either ropes, chains, or the like, and the ropes or chains 36 extend to side posts 46, whence they extend to other suitable posts, (not shown,) which are designed to hold the ends of the operating ropes or chains in convenient position. The latch-post is provided with vertical cleats, which form a groove to receive the latch-bolt, and the side posts are provided with shoulders, which are engaged by the latch-bolt to hold the gate against accidental closing.

It will be seen that the gate is easily operated and is adapted to open in either direction and is capable of being adjusted vertically to permit animals to be separated, and also to enable the gate to swing clear of snow-drifts. The upper end of the pintle-rod is provided with an eye through which passes the latch-cord, and the lower end of the pintle-rod is journaled in a block arranged at the lower end of the hinge-post. When the side posts 46 are not employed and it is desired to hold the gate open without its being liable to be accidentally closed by wind or other cause, a pivoted bar 47 may be provided. The bar 47 has its upper end pivoted to the gate and it is adapted to engage the ground and partially support the gate and prevent the same closing, and when not in use it is held up above the ground to permit the gate to swing clear by a pin 48, which is connected with the pivoted bar by a cord, chain, or the like, and is adapted to engage a perforation of the bottom rail of the gate.

What I claim is—

1. The combination, with a hinge-post, a swinging gate provided with a drum, the horizontally-disposed U-shaped frame pivotally mounted at the upper end of the hinge-post, and the chain wound upon the drum and having its end connected with the U-shaped frame at opposite sides of the pivotal point, substantially as described.

2. The combination, with a hinge-post and a swinging gate provided with a drum and having a latch-bolt, of the frame horizontally disposed and pivotally mounted at the upper end of the hinge-post, the chain wound around the drum and connected with the frame, the levers fulcrumed on the frame and having their inner ends connected with the latch, and means for operating the levers, substantially as described.

3. The combination of the hinge-post, the swinging gate provided with a drum, the U-shaped frame pivotally mounted at the upper end of the hinge-post and provided with rods extending upward from its arms, the cross-bar connecting the rods, the levers fulcrumed on the cross-bar, a latch-bolt, the Y-shaped plate having its arms connected to said levers and provided in its shank with a series of perforations, and the hook connected with the latch-bolt and arranged to engage the perforations, substantially as described.

4. The combination of the hinge-post, the swinging gate provided with a drum and having a spring-actuated latch, the pivoted frame 20, arranged at the top of the hinge-post, the chain wound around the drum and having its ends connected with the frame, the levers fulcrumed on the frame 20, the plate 37, connected to the inner end of the levers and provided with a series of perforations, a hook arranged to engage the perforations, and means for connecting the hook and the spring-actuated latch-bolt, substantially as described.

5. The combination of the hinge-post, the castings secured to the hinge-post, the hinge-straps, the pintle-rod connecting the hinge-straps and the castings, the gate, the bar arranged in the hinge-straps, the bolts connecting the bar and the gate and provided with an eye to receive the pintle-rod, the spacing-sleeves arranged on the bolts, and means for securing the gate in its vertical adjustment, substantially as described.

6. The combination of the hinge-post, the bracket secured to the same and provided with perforated ears, the frame 20, mounted in the bracket, the plate secured to the top of the hinge-post and extending from opposite sides of the same and provided at one end with a perforation, the pintle-rod arranged in the perforation, the bolt pivoting the frame in the bracket and having its upper end secured to the plate, and the block interposed between the bracket and the plate, substantially as described.

In testimony that I claim the foregoing as my own I have hereto affixed my signature in presence of two witnesses.

GEORGE HOSKINS.

Witnesses:
ROBERT H. VANMETRE,
EDWARD S. TURNER.